United States Patent Office 2,855,376
Patented Oct. 7, 1958

2,855,376

COATING COMPOSITIONS FOR METAL SURFACES COMPRISING LIQUID POLYBUTADIENE AND RUBBERY POLYBUTADIENE

James A. Shotton and Lee O. Edmonds, Bartlesville, Okla., assignors to Phillips Petroleum Company, a corporation of Delaware No Drawing. Application February 21, 1955
Serial No. 489,752

3 Claims. (Cl. 260—33.6)

This invention relates to coating compositions for metal surfaces. In a further aspect this invention relates to coating compositions of improved flexibility and resistance to deterioration during processing when these coating compositions are applied to surfaces in contact with foods and beverages.

The following are objects of this invention.

An object of this inventoin is to provide an improved metal coating composition. A further object of this invention is to provide metal coating compositions particularly suitable for the coating of food and beverage containers. A further object of this invention is to provide can coating compositions of increased flexibility and hardness and which retain these improved characteristics during normal processing.

Other objects and advantages of our invention would be apparent to one skilled in the art upon reading this disclosure.

The objects of our invention are obtained by incorporating in a liquid polymer, formed by a majority of 1,2 addition, a minor amount of rubbery polymer in which the major amount of the polymer is formed by 1,4 addition. Liquid diolefin polymers have been used as coating compositions for some time and liquid polymers having a major amount of 1,2 addition, such as those prepared by sodium catalyzed, mass polymerization, have many desirable properties. However, one drawback in the use of these polymers is their brittleness following curing. We have discovered that if a minor amount of a rubbery diene polymer is incorporated in the liquid diene polymer, the flexibility and other characteristics are improved. The rubbery polymers used in our invention are those wherein the major amount of the polymer is formed by 1,4 addition. Such polymers are prepared by emulsion polymerization of the type used for GR–S rubber. The liquid polymers are prepared by sodium catalyzed mass polymerization, this resulting in a major amount of 1,2 addition.

The more detailed practice of our invention is illustrated by the following examples, the parts being given by weight unless otherwise stated. There are, of course, many other forms of the invention than these specific embodiments.

The wedge bend test set forth in these examples is a measure of the flexibility of the coating composition. To make the wedge bend test, strips 4 inches by 1½ inches were cut from coated plate. These strips were then preformed, with the coated side up, by bending over a preformer made from a quarter inch rod. The strips are formed by placing them length-wise along the rod and bending them into a U-shape approximately ¾ inch on a side. These preformed strips were then placed in the wedge bend apparatus and a 3.5 pound weight released from a height of 20 inches. The anvil on the wedge bend apparatus was designed so that one end of the preformed strip was mashed together and the other end retained the original U-shape. The measurement reported was determined after placing the specimen in a 5 percent copper sulfate solution, to which a few drops of acid were added, for two minutes to develop the fracture of the coating after which the specimen was rinsed with tap water. The length of the continuous fracture was measured with a ruler and recorded in inches. This test gives a good measurement of the ability of coated metal plate to fabricate in regular can making machinery such as the body maker or the punch press used to press out the ends of the cans. The shorter the length of the fracture is, the better the coating composition.

The film weight is the number of milligrams per square inch of the coating.

To determine the cut edge adhesion, a piece of the coated material, following baking, was cut with tin snips, the tin snip blades were held about 30 to 45° out of vertical so that the cut edge was turned or drawn during the cutting. The turned edge was tested by pressing pressure sensitive cellulose tape ("Scotch" tape) on the edge and then pulling the tape loose. The tape was examined to determine if any coating came loose from the plate and adhered to the tape. If the cut edge adhesion was excellent no coating was found on the tape. The degree of adhesion was qualitatively measured by the amount of coating adhering to the tape being, in the examples, rated on an arbitrary scale, 10 representing excellent adhesion down to 0 for substantially no adhesion.

The baked films were tested for pencil hardness by finding the pencil of a given hardness which would scratch the film. For instance, if the film was not scratched by a 5H pencil but was scratched by a 6H pencil, the hardness was recorded as 6.

EXAMPLE I

A rubbery polybutadiene was prepared by blending the polymers made by emulsion polymerization using the following recipes:

|  | Parts by Weight | |
| --- | --- | --- |
| Water | 180 | 180 |
| Butadiene | 100 | 100 |
| Santomerse #3 [1] | 1.25 | 1.25 |
| KOH | | 0.05 |
| $K_4P_2O_7$ | 0.165 | 0.165 |
| $FeSO_4.7H_2O$ | 0.139 | 0.139 |
| Diisopropylbenzene hydroperoxide | 0.107 | 0.107 |
| Tert-dodecyl mercaptan | 0.8 | 0.75 |

[1] Alkyl aryl sodium sulfonate.

The polymerization was conducted at 41° F. for 11 and 17.2 hours, respectively, giving conversions of 61 and 60 percent, 0.2 part of dinitrochlorobenzene being added as a shortstop. Latices from the two runs were blended to give a polymer having a Mooney value (ML–4) of 20 and, based upon the polymer, 1.25 percent by weight of an alkylated phenol antioxidant (Deenax) was added. The polymer was coagulated by means of alcohol.

Liquid polybutadiene was prepared in a series of runs in which the butadiene was polymerized in the presence of finely divided sodium using 1.5 weight percent sodium based on the butadiene. In making these runs, the temperature ranged from approximately 190° F. to approximately 210° F. and pressure sufficient for liquid phase operation was maintained by controlling the rate of addition of the butadiene. The solvent for the reaction was n-heptane, the weight ratio of the n-heptane to butadiene being 1.5:1. Polymers from several runs were blended to give liquid polybutadiene having a viscosity of 1500 Saybolt Furol seconds at 100° F. and a Gardner color of 11.

Using toluene as the solvent, the rubbery polymer was first dissolved in the solvent and the liquid polybutadiene added. The solutions were diluted to 25 weight percent non-volatiles content and applied by brushing to commercial tin plate. The tin plate was of two types, electrolytic and hot dip. The test specimens were baked 15 minutes at 400° F. and wedge bend tests made. Film weights were also determined. Results on three compositions are shown below.

|  | Composition | | |
| --- | --- | --- | --- |
|  | 1 | 2 | 3 |
| 20 Mooney polybutadiene, grams | 25 | 50 | 75 |
| Liquid polybutadiene, grams | 475 | 450 | 425 |
| Percent rubber, based on total polybutadiene | 5 | 10 | 15 |
| Toluene, grams | 500 | 500 | 500 |

|  | Composition | | | | | |
| --- | --- | --- | --- | --- | --- | --- |
|  | 1 Tin Plate | | 2 Tin Plate | | 3 Tin Plate | |
|  | Electrolytic | Hot Dipped | Electrolytic | Hot Dipped | Electrolytic | Hot Dipped |
| Wedge bend, in | 1⅜, 1¼ | 1½, 1½ | 1³⁄₁₆, 1³⁄₁₆ | 1⅜, 1⅜ | 1⅝, 1½ | 1⅜, 1⅝ |
| Film weight [1] | 8.7 | 9.8 | 9.6 | 7.6 | 7.8 | 6.8 |
| Cut edge adhesion | excellent | good | excellent | good | excellent | good |

[1] Mg./sq. in.

Coating compositions were prepared using a minor proportion of liquid polybutadiene, prepared by emulsion polymerization at 41° F., and a major proportion of the liquid polybutadiene described above. The following recipe was employed for preparation of the emulsion copolymer:

| | Parts by weight |
| --- | --- |
| Butadiene | 100 |
| Water | 180 |
| Santomerse[1] | 2.5 |
| $K_4P_2O_7$ | 0.354 |
| $FeSO_4 \cdot 7H_2O$ | 0.280 |
| Diisopropylbenzene hydroperoxide | 0.194 |
| Tert-dodecyl mercaptan | 5 |

[1] Alkyl aryl sodium sulfonate.

A 70 percent conversion was reached in 17.4 hours.

Four compositions were prepared using toluene as a solvent. The solutions were diluted to 20 weight percent non-volatiles content and applied by brushing to commercial tin plate as hereinbefore described. The test specimens were baked 15 minutes at 400° F. and wedge bend tests made. Film weights were similar to those obtained from the compositions prepared from rubbery polybutadiene and liquid polybutadiene. Results are shown below.

Results of these tests show the superiority of the coating compositions prepared from a mixture of emulsion rubbery polybutadiene and sodium liquid polybutadiene, over those prepared from a mixture of emulsion liquid polybutadiene and sodium liquid polybutadiene.

EXAMPLE II

A portion of the rubbery emulsion polybutadiene of Example I was hydrogenated according to the method of Jones et al application Serial No. 395,291 to give a product having a residual unsaturation of 50 percent. Five grams of this hydrogenated polymer and 95 grams of the sodium catalyzed liquid polybutadiene of Example I, were dissolved in 100 grams of toluene and this mixture was applied by brushing onto the tin plate. The test specimens were baked 15 minutes at 400° F. and wedge bend tests were made. The film weight was also determined, the results being as follows:

Wedge bend, in _____ ½, ½, ⅜
Film weight, mg./sq. in _____ 15.7

EXAMPLE III

This example is provided to show the improvement obtained when polybutadiene rubber or hydrogenated polybutadiene is added to the liquid polybutadiene of the prior art. In the following tests, liquid polybutadiene was mixed with emulsion polybutadiene rubber and, in separate runs, with the rubber following its hydrogenation to an unsaturation of 54.1 percent. Two controls are set forth, the first being a plate coated with the liquid polybutadiene alone, and the second being a commercially coated can. The plate was coated by applying a 50 percent solution of the material in toluene with a roller coater followed by baking for 15 minutes at 400° F. Following this treatment, strips of the coated plate were embedded in dog food in cans and the cans were then sealed and processed under 15 p. s. i. g. steam pressure (250° F.). After an initial 60 minutes of processing, cans were removed at 15 minute intervals and, after standing for 24 hours at room temperature,

|  | Composition | | | |
| --- | --- | --- | --- | --- |
|  | 1 | 2 | 3 | 4 |
| Liquid polybutadiene, emulsion | 20 | 40 | 60 | 80 |
| Liquid polybutadiene sodium | 380 | 360 | 340 | 320 |
| Percent emulsion polymer based on total polymer | 5 | 10 | 15 | 20 |
| Toluene, grams | 400 | 400 | 400 | 400 |
| Tin plate, electrolytic: | | | | |
| Wedge bend | 2, 2⅞, 2⅛ | 2, 2½, 2⅞ | 2⅛, 2, 1¾ | 2, 2¼, 2⅛ |
| Film weight | 5.3–6.1 | 6.9–7.3 | 6.5–7.2 | 6.1–7.1 |
| Cut edge adhesion | good | good | fair to good | fair to good |
| Tin plate, hot dipped: | | | | |
| Wedge bend | 3, 2, 2¾ | 2, 2⅜, 2¼ | 2⅝, 2¾, 3¼ | 3, 3, 2⅞ |
| Film weight | 5.0–6.5 | 6.8–7.0 | 6.2–7.2 | 5.7–6.3 |
| Cut edge adhesion | poor to fair | poor to fair | poor to fair | poor | they were opened and a determination of the properties of the different coating compositions was made.

Runs were made using 10 and 15 parts by weight per 100 parts of the polymers of polybutadiene rubber and at a level of 10 parts by weight per 100 parts of the hydrogenated polybutadiene rubber. Comparative ratings are tabulated below.

*Table I*

| Processing Time (min.), 15 p. s. i. g. | Coating | | | | | | | | | |
|---|---|---|---|---|---|---|---|---|---|---|
| | 100% Liquid Polybutadiene | | Liquid Polybutadiene 90, Polybutadiene Rubber 10 | | Liquid Polybutadiene 85, Polybutadiene Rubber 15 | | Liquid Polybutadiene 90, Hydrogenated Polybutadiene 10 | | Commercial Coating | |
| | Pencil Hardness | Adhesion [1] | Pencil Hardness | Adhesion | Pencil Hardness | Adhesion | Pencil Hardness | Adhesion | Pencil Hardness | Adhesion |
| 0 | 6 | | 6 | | 6 | | 6 | | 4 | |
| 60 | 5 | 10 | 5 | 10 | 5 | 10 | 5 | 10 | 2 | 0 |
| 75 | 5 | 10 | 5 | 10 | 5 | 10 | 5 | 10 | 2 | 0 |
| 90 | 4 | 9.5 | 6 | 10 | 6 | 10 | 5 | 10 | 2 | 0 |
| 105 | 3 | 1.5 | 5 | 8 | 5 | 10 | 4 | 10 | 2 | 0 |
| 120 | 3 | 1.0 | 4 | 9 | 4 | 5 | 4 | 1.5 | 2 | 0 |
| 135 | 3-4 | 0.5 | 4 | 1.5 | 4 | 1.5 | 4 | 2.5 | 2 | 0 |
| 150 | 3 | 0.5 | 4 | 5.0 | 4 | 0.8 | 4 | 1.5 | 0 | 0 |

[1] Tested by placing pressure sensitive tape across metal strip and pulling it away. It is a measure of adhesion after processing.

Examination of these data show that the liquid polybutadiene coating remained satisfactory for 75 minutes; that the adhesion of the 90/10 liquid polybutadiene/polybutadiene rubber coating remained perfect for 90 minutes; and the coatings employing 15 parts of the polybutadiene rubber and 10 parts of the hydrogenated polybutadiene rubber retained their perfect adhesion for over 105 minutes. Furthermore, the coatings of this invention remained harder for a longer period of time.

An additional series of runs was made, this time using a bake temperature of 380° F. for 15 minutes. After processing a prepared meat composition for 90 minutes the following results were obtained.

| Composition, parts by Weight | | Film Weight | Pencil Hardness before Processing | After Processing | |
|---|---|---|---|---|---|
| Polybutadiene Rubber | Liquid Polybutadiene | | | Adhesion | Pencil Hardness |
| | 100 | 7.1 | 5-6 | 1.5 | 4 |
| 10 | 90 | 7.1 | 6+ | 10.0 | 5 |
| 15 | 85 | 8.6 | 6 | 10.0 | 4 |

The liquid polymer which is generally prefered is a homopolymer of 1,3-butadiene but homopolymers of other conjugated dienes such as 2,3-dimethyl-1,3-butadiene, isoprene, and piperylene can also be used. Furthermore, copolymers prepared from mixtures of conjugated dienes with compounds which contain the characteristic structure $CH_2=C<$ and, in most cases, have at least one of the disconnected valences attached to an electronegative group, that is, a group which increases the polar character of the molecule such as chlorine, or an organic group containing a double or triple bond such as vinyl, phenyl, cyano, carboxy, or the like. Included in this latter group are the aryl olefins such as styrene, various alkyl styrenes, alpha-methyl styrene, vinyl naphthalene, and the like; acrylic and substituted acrylic acids and their esters, nitriles and amides such as acrylic acid, methacrylic acid, methyl acrylate, ethyl acrylate, methyl methacrylate, acrylonitrile; methyl isopropenyl ketone; methyl vinyl ether; vinyl acetate; vinyl chloride; vinylacetylene, etc. The copolymers which are applicable are those prepared using at least 70 percent by weight of the conjugated diene of the total monomeric material. The liquid polymers are prepared by sodium catalyzed mass polymerization so that the major amount of the polymerization occurs by 1,2 addition. Other catalysts can be used provided the polymer addition results in the desired 1,2 addition.

The rubbery polymers are those prepared by methods which produce a major amount of 1,4 addition, this conventionally being obtained by emulsion polymerization methods. For these polymers, homopolymers of butadiene and copolymers of butadiene with styrene are preferred. However, copolymers with other monomers containing the $CH_2=C<$ group can also be used, these additional monomers being the same as those set forth above for use in the production of the liquid diene copolymers. Likewise the conjugated diene should comprise at least 70 percent by weight of the total monomeric material.

Furthermore, as shown in Examples II and III, the rubbery polymer can be hydrogenated prior to its incorporation in the coating composition. Generally these hydrogenated polymers have a residual unsaturation of from 10 to 50 or 60 percent. Hydrogenated copolymers can be used but we prefer to use the hydrogenated rubbery polymer prepared from polybutadiene.

When preparing the compositions of this invention, we incorporate from 1 to 35 percent, preferably 2 to 20 percent by weight of the rubbery polymer or hydrogenated rubbery polymer based upon the total polymeric material employed. The composition can contain both unhydrogenated rubbery polymer and hydrogenated rubbery polymer.

Those skilled in the art will recognize that other ingredients are frequently incorporated in coating compositions such as those of the present invention. For instance, when used as coatings for food containers, particularly when food containing sulfur is to come in contact with the metal surface, zinc oxide can be added to the composition in order to improve the resistance to decolorization of the coating. Pigments and driers can also be present if desired, metal naphthenates being the commonly used driers.

The polymeric coating material is conveniently prepared in the form of a solution which can be applied to metal surfaces by means of roller coating, or it can be applied by other methods such as spraying, brushing, or dipping. Solvents which are applicable consist of both aromatic and aliphatic types and include toluene, xylene, benzene, Stoddard solvent, mineral spirits, VM and P naphtha, and the like. The amount of solvent used will vary depending upon such factors as the nature of the polymers employed and the method of application to metal surfaces. Generally the amount of solvent is adjusted to give a solution containing in the range between 10 and 50 percent by weight non-volatile matter.

Following the application of the coating composition, the metal surface is dried or baked at a temperature in the range between room temperature (around 65° F.) and 600° F. When driers are present, lower temperature can be employed and in many instances room temperature is sufficient. As the baking temperature is increased, the time of baking can be shortened. In general, the time can vary in the range between 2 minutes and 12 hours. Good results have been obtained with some compositions by baking 4 minutes at 490° F., 15 minutes at 380–400° F., etc.

The compositions herein described are particularly suitable for coating sheet metal such as tinned plate, terne plate, bonderized steel, or other thin metal sheets used in making metal containers for storing food, beer, oil, and other products. These compositions are applicable for inside and outside protective coatings or as base coatings for lithographing exterior surfaces of containers or as base coatings for wax-lined beer cans.

The amount of coating composition applied, i. e., the film weight, will vary. For can coating as well as other instances where thin metal surfaces are to be protected, it is generally preferred that the film be thin, i. e., it is preferable that the film weight be low. For other types of coatings such as on pipes, various types of enamelled surfaces, etc., heavier coatings are applied. In some instances it might be desirable to apply more than one coat of the polymeric composition. In general, when coating cans or other thin metal surfaces, the film weight will vary in the range from 1 to 10 milligrams per square inch while with other types of coatings the film weight may be as high as 25 milligrams per square inch or even higher. The presence of the rubbery component in the compositions is particularly valuable when the heavier coatings are applied since it has a marked effect on flexibility. While liquid polymers can be used alone as coatings for metal surfaces, they have a tendency to be brittle and will chip or crack. As the film weight is increased, this effect becomes more pronounced.

The foregoing description contains a limited number of embodiments of our invention. It will be understood that the invention is not limited to the specific conditions described since numerous variations are, of course, possible.

We claim:

1. A composition suitable for coating metal surfaces comprising, (1) a liquid polymer, in which a major amount of the polymer is formed by 1,2 addition, selected from the group consisting of homopolymers of conjugated dienes containing 4 to 6 carbon atoms and copolymers prepared by polymerizing, based on 100 parts by weight of monomers, at least 70 parts of a conjugated diene containing 4 to 6 carbon atoms and up to 30 parts of copolymerizable monomers containing a $CH_2=C<$ group; and (2) polymeric material selected from the group consisting of rubbery polymers in which the major amount of the polymer is formed by 1,4 addition selected from the group consisting of homopolymers of conjugated dienes containing 4 to 6 carbon atoms and copolymers prepared by polymerizing, based on 100 parts by weight of monomers, at least 70 parts of a conjugated diene containing 4 to 6 carbon atoms and up to 30 parts of copolymerizable monomers containing a $CH_2=C<$ group and said rubbery polymers wherein the unsaturation has been reduced to a value of 10 to 60 percent of the original unsaturation by hydrogenation; the amount of the second polymeric material being 2 to 20 percent by weight based upon the total polymeric material employed.

2. A composition, suitable for coating metal surfaces, comprising liquid polybutadiene having a major amount of 1,2 addition and rubbery polybutadiene having a major amount of 1,4-addition, the amount of said rubbery polymer being 2 to 20 percent by weight based on the total polymeric material employed.

3. A composition, suitable for coating metal surfaces, comprising liquid polybutadiene having a major amount of 1,2 addition and rubbery polybutadiene having a major amount of 1,4 addition having its unsaturation reduced to a value of 10 to 60 percent of its original unsaturation by hydrogenation, the amount of said rubbery polymer being 2 to 20 percent by weight based on the total polymeric material employed.

References Cited in the file of this patent
UNITED STATES PATENTS

| | | |
|---|---|---|
| 2,521,361 | Gessler | Sept. 5, 1950 |
| 2,638,460 | Crouch | May 12, 1953 |
| 2,701,780 | Nelson et al. | Feb. 8, 1955 |